Figure 1:
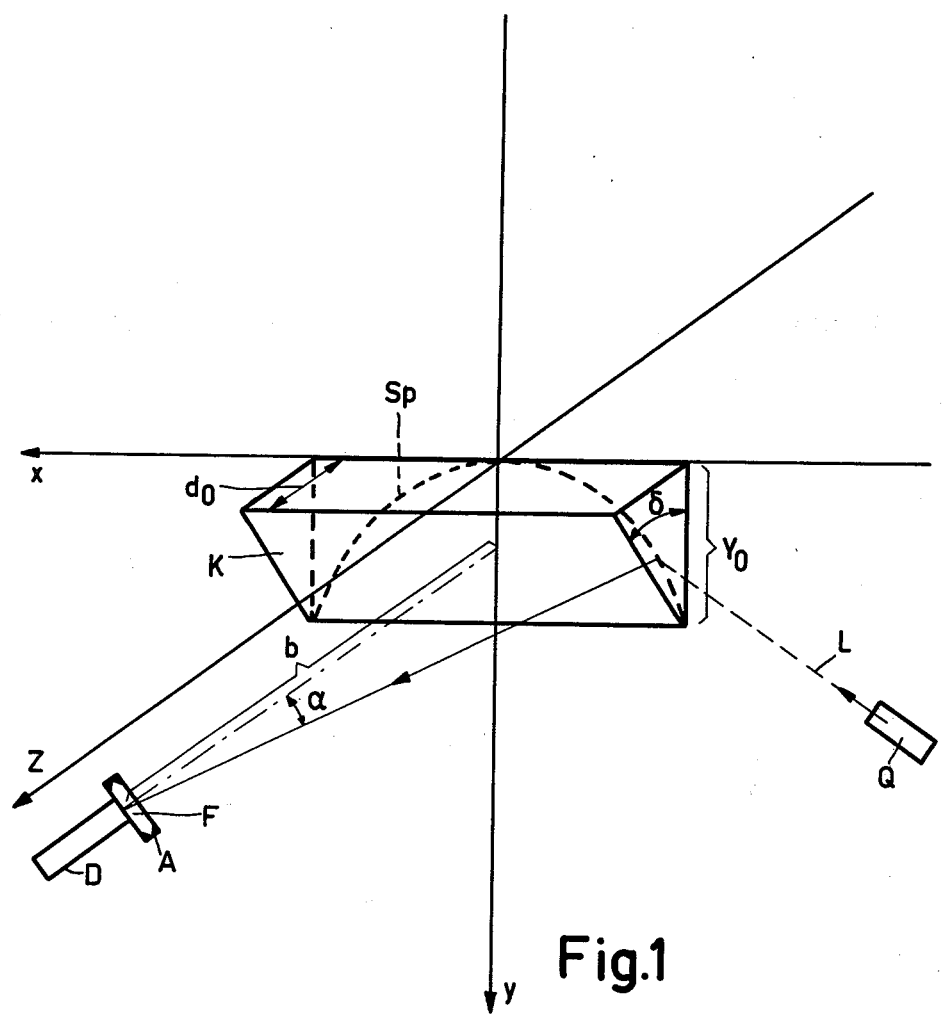

United States Patent [19]

Bergmann et al.

[11] 4,195,223

[45] Mar. 25, 1980

[54] APPARATUS FOR OPTICALLY SCANNING A SURFACE

[75] Inventors: Udo Bergmann, Schwarzenbek; Karl Klose, Hamburg, both of Fed. Rep. of Germany

[73] Assignee: U.S. Philips Corporation, New York, N.Y.

[21] Appl. No.: 873,420

[22] Filed: Jan. 30, 1978

[30] Foreign Application Priority Data

Jan. 28, 1977 [DE] Fed. Rep. of Germany ....... 2703504

[51] Int. Cl.$^2$ ................................................ H01J 3/14
[52] U.S. Cl. ..................................... 250/216; 350/286
[58] Field of Search ............... 250/216, 234, 235, 236, 250/566, 568; 356/203, 209; 350/286

[56] References Cited

U.S. PATENT DOCUMENTS

| 3,514,619 | 5/1970 | Ireland | 250/235 |
| 3,614,194 | 10/1971 | Harris | 350/286 |
| 4,081,207 | 3/1978 | Dippel | 350/286 |

*Primary Examiner*—David C. Nelms
*Attorney, Agent, or Firm*—Thomas A. Briody; Jack E. Haken

[57] ABSTRACT

Apparatus for optically scanning a surface, the radiation path between the light source and light detector including a wedge for correcting undesired intensity variations which occur when a homogeneous non-textured surface is scanned.

4 Claims, 3 Drawing Figures

APPARATUS FOR OPTICALLY SCANNING A SURFACE

The invention relates to an apparatus for optically scanning a surface, comprising a light source for producing a light beam which scans the surface in accordance with a scanning curve, and a light detector for detecting the luminous flux issuing from the surface.

Scanning object surfaces with the aid of a light beam is a technique which is currently used in many fields of research and technology. As an example, packages of goods are provided with a stripe code and are exposed to a moving laser beam at the point of sale. The reflected light is measured by a light detector unit, which produces a voltage level (current level) which corresponds to the reflected luminous flux. This measurement essentially presents two problems: first of all the light spot generally does not follow a straight but a curved scanning path on the surface to be scanned. Secondly, the amplitude of the electrical signal is generally not constant—not even when a highly homogeneous non-textured surface is scanned—because the signal is modulated to a degree which depends on the optical elements used and the spatial variation of the light beam. In this respect the angles at which the light emanates from or is incident on the surfaces, as well as the optical path length between the light spot and the detector are important. An undesirable consequence of this is that grey shades of a surface cannot be converted into analog electrical signals in a faithful manner. If, moreover, the analog electrical signal is to be digitized (for example in X-ray film scanners), this may give rise to substantial problems in respect of signal processing. When the surface to be scanned comprise only two differently textured zones with widely differing optical properties (for example black-white), the electrical signal can be converted into digital 0–1 information in a comparatively simple manner, but obtaining digital signals becomes difficult if the optical properties of the two surface zones resemble each other, so that the modulation of the luminous flux which is incident on the light detector leads to incorrect digital output signals.

It is, therefore, desirable to correct the luminous flux locally in such a way that the light detector supplies an undistorted electrical signal which is analogous to the surface to be scanned. It is the object of the invention to provide an apparatus by means of which this can be realized.

The apparatus in accordance with the invention is characterized in that the radiation path between the light source and the light detector includes a wedge whose wedge angle, absorption coefficient and spatial position have been selected so that when a homogeneous non-textured surface is scanned the rays which issue from a first part of the scanning curve and whose intensity at the location of the detector in the absence of the wedge would be substantially higher than a predetermined constant level reach the detector through a thick zone of the wedge and are thus attenuated to comparatively great extent, while the rays which issue from a second part of the scanning curve and whose intensity at the location of the detector in the absence of the wedge would only be slightly higher than the predetermined constant level, reach the detector through a thin zone of the wedge and are thus attenuated to a comparatively small extent. The light detector thus indicates an overall intensity distribution of constant level in the case of a non-textured surface.

Figure 2:
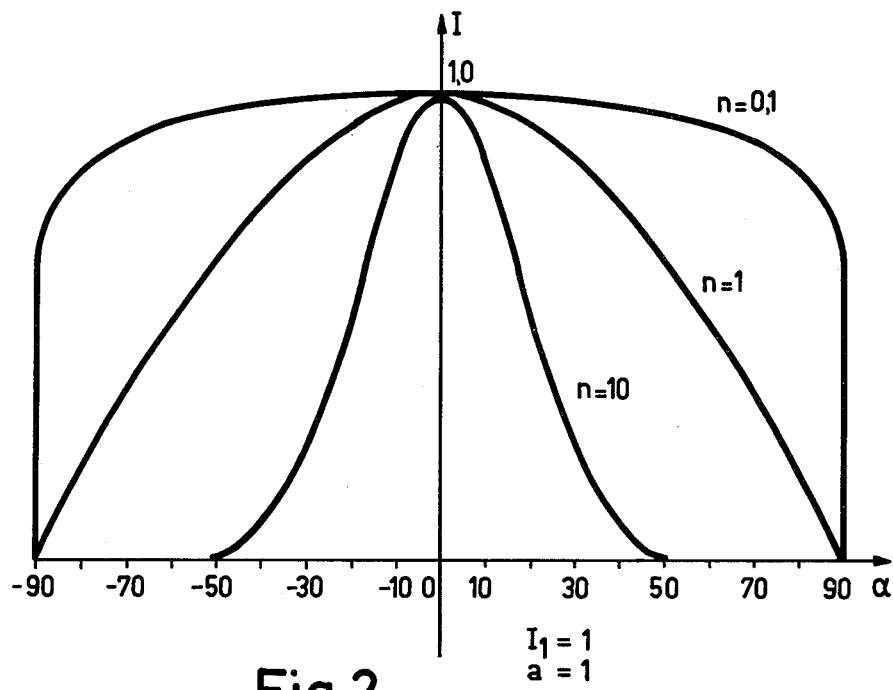
Figure 3:
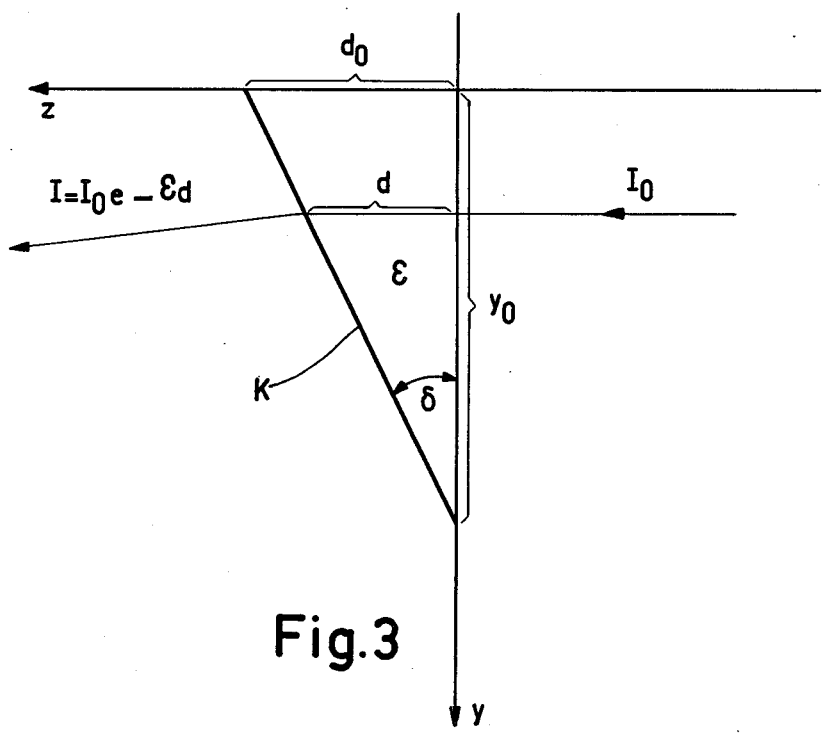

The invention will be described in more detail with reference to the drawings. In the drawings:

FIG. 1 schematically shows an embodiment of an apparatus in accordance with the invention, FIG. 2 shows intensity curves, and FIG. 3 shows a cross-section of a wedge.

In FIG. 1 a light beam L, which is obtained from a light source Q disposed behind the plane of drawing, and which reaches a plane surface (xy-plane), scans said surface along with a scanning curve Sp which is symmetrical relative to the y-axis. The light source Q may, for example be a laser. Behind the light-transmitting surface—the plane of drawing in FIG. 1—a wedge K is disposed in such a way that one of the wedge faces extends parallel to the surface. The wedge need not necessarily be disposed directly on or against the surface, nor need it be a rectangular wedge with only one wedge angle $\delta$. The wedge may be solid or it may be a hollow wedge which is filled with a liquid having light-absorbing, light-dispersing or luminescent properties. Alternatively, the wedge may be a combination of wedges which are movable relative to each other and whose wedge angles and absorption coefficients are determined or calculated experimentally.

The surface to be scanned need not be light-transmitting, operation in the reflection mode being also possible. However, for simplicity of the description a light transmitting system has been selected.

A light detector D with an aperture A, is disposed behind the surface (i.e. in front of the plane of drawing), where the light rays have at different angles of incidence $\alpha$ ($\alpha$ is measured relative to the normal to the light-sensitive surface F of the detector). If no wedge is used, and the brightness of the surface is constant over the entire scanning curve Sp the measured luminous intensity generally decreases rapidly as $\alpha$ increases (for example in accordance with a $\cos^4 \alpha$ law). The decrease of the luminous intensity measured at the location of the detector with increasing distance between the light spot and the zero point of the scanning surface is described in a most general sense by the following relationship:

$$I = I_1 (\cos a\alpha)^n \quad (1)$$

where a is a constant factor ($a > 0$)

FIG. 2 shows some intensity curves from which it is apparent that practical intensity distributions generally satisfy the equation (1) in good approximation.

The wedge will attenuate the light from the scanned surface as a function on the thickness of the wedge which is traversed. In FIG. 3:

$$I = I_0 e^{-\epsilon d} \quad (2)$$

$I_0$ = intensity of the light emanating from the surface
$\epsilon$ = absorption coefficient of the wedge material
$d$ = thickness of the wedge in the direction of the z-axis.

The relationship between d and y is:

$$d = d_0 (1 - [y/y_0]) \quad (3)$$

whereby $y_0$ is the width of the wedge in the y-direction and $d_0$ the width of the wedge in the z-direction. In y is dependent on the location of the light spot and may generally be represented by $$y = f(x) \quad (4)$$

(which is the equation of the scanning curve Sp). Thus, the intensity measured by the detector D may be represented by equation:

$$I = I_o (\cos a \alpha)^n \cdot e^{-\epsilon d_o (1 - \frac{f(x)}{y_o})} \quad (5)$$

and, when $$x \approx b \tan \alpha \quad (6)$$

(b = distance detector/scanning surface, see FIG. 1), it follows that:

$$I = I_o (\cos a\alpha)^n \cdot e^{-\epsilon d_o \{1 - \frac{f(b) \tan \alpha}{y_o}\}} \quad (7)$$

In order to keep I always constant at constant $I_o$:

$$(\cos a \alpha)^n \cdot e^{\epsilon \frac{d_o}{y_o} f(b \tan \alpha)} \approx 1 \quad (8)$$

or $$(\cos a \alpha)^n \approx e^{-\epsilon \frac{d_o}{y_o} f(b \tan \alpha)} \quad (9)$$

From equation (9) it follows that the correction of the luminous flux issuing from a light spot improves, according as the function $(\cos a\alpha)^n$ is better approximated by the function $e^{-\epsilon d_o/y_o f(b \tan \alpha)}$. Since for $0° \leq \alpha \leq \pi°$ both types of curves assume values between 0 and 1, a deviation of not more than 0.03 may be considered a satisfactory approximation:

$$|(\cos a \alpha)^n - e^{-\epsilon \frac{d_o}{y_o} f(b \tan \alpha)}| \leq 0.03 \quad (10)$$

The requirements expressed by equation (10) can be met for a large number of different scanning curves and intensity distributions. The required properties of the wedge may be calculated or determined experimentally.

What is claimed is:

1. In an apparatus for scanning a surface of the type comprising:

light source means which function to project a beam of light along a first portion of an optical path to said surface and to scan said surface with said beam, whereby light is caused to issue from said surface and, in the case of a homogeneous non-textured surface, to issue with a greater intensity from a first portion of said surface than from a second portion of said surface and light detector means which receive said issuing light along a second portion of said optical path;

the improvement comprising:

wedge compensating means disposed on said optical path which function to attenuate light so that, in the case of a homogeneous non-textured surface, the intensity of light received by said detector means from said first portion of the surface is substantially equal to the intensity of light received by said detector means from the second portion of said surface.

2. The improvement of claim 1 wherein the wedge compensating means are disposed between the source means and the surface.

3. The improvement of claim 1 or 2 wherein the wedge compensating means is a solid, light-attenuating wedge.

4. The apparatus of claims 1 or 2 wherein the wedge compensating means is a hollow, liquid-filled wedge.

* * * * *